(No Model.)
C. A. WORRALL.
FASTENING FOR PINS.
No. 572,144.          Patented Dec. 1, 1896.
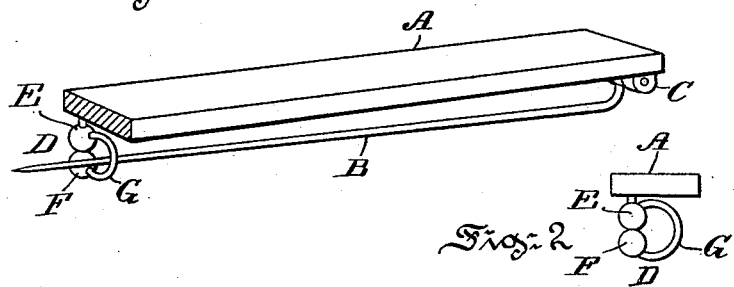
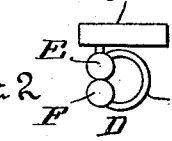
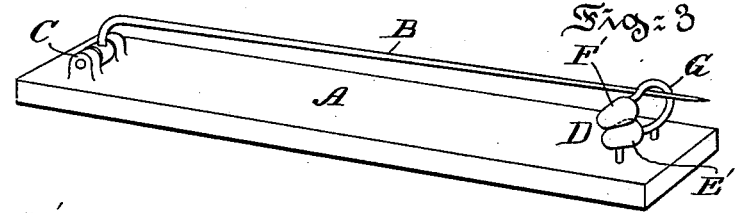
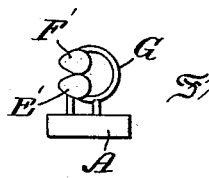
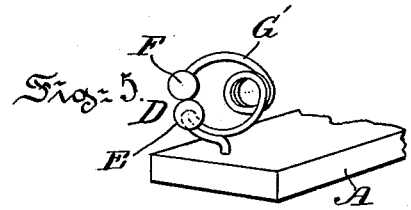
Witnesses:
W. A. Schaefer
Craig Shirds
Inventor:
Clarence A. Worrall
by his attorney
Chas. A. Petter
THE NORRIS PETERS CO., PHOTO-LITHO., WASHINGTON, D. C.

UNITED STATES PATENT OFFICE.

CLARENCE A. WORRALL, OF PHILADELPHIA, PENNSYLVANIA, ASSIGNOR OF ONE-HALF TO PARKE C. DOUGHERTY, OF SAME PLACE.

FASTENING FOR PINS.

SPECIFICATION forming part of Letters Patent No. 572,144, dated December 1, 1896.

Application filed January 21, 1896. Serial No. 576,316. (No model.)

*To all whom it may concern:*

Be it known that I, CLARENCE A. WORRALL, a citizen of the United States, and a resident of the city and county of Philadelphia, State of Pennsylvania, have invented certain new and useful Improvements in Fastenings for Pins, of which the following is a specification.

My invention relates to improvements in fastenings or catches for securing the free or pointed ends of pins used on breastpins, badges, or like articles; and the object of my invention is to furnish a catch or fastening into and out of which the pin may be passed with the greatest ease by the operator, and which will, when not assisted by the operator, firmly and positively hold the pin in place.

In the accompanying drawings, forming part of this specification, and in which similar letters of reference indicate similar parts throughout the several views, Figure 1 is a perspective view of a breastpin furnished with my improved catch or fastening. Fig. 2 is a front elevation of the catch, Fig. 1; and Figs. 3, 4, and 5 are views of modifications of my invention.

A is the base of the pin, and B the pin proper, one end of which is pivotally connected to the under part of base A, as shown at C.

D is the catch or fastening for securing the free or pointed end of the pin. This fastening consists of one or two rounded or knoblike surfaces, one of which is held against the other by means of a spring. One of the surfaces may be secured to or form part of the base A, and the spring which carries the other surface may be secured to the fixed surface or secured directly to the base A. In Figs. 1 and 2 the surfaces are shown as spheres E F, connected by a plain spring G; in Figs. 3 and 4 as pear-shaped bodies E' F', connected by a similar spring G. In Fig. 5 are shown spheres E F and a spring G', which is coiled in order to give it greater power and elasticity. The two surfaces touch one another practically at but one point and form wedge-shaped or flaring entrances which greatly facilitate the guiding of the pin when forcing it either in or out of the catch.

The spring should be stout enough to necessitate considerable force to be used to separate the rounded surfaces sufficiently to allow the passage of the pin between them.

Having thus described my invention, what I claim is—

In a fastening for pins, the combination with the base and the pin pivoted to the base, of a rounded projection rigidly connected with the base, a curved spring connected with said projection and inclosing a space for the pin, and a rounded head upon the end of the spring, said head being normally spring-pressed upon the said rounded projection, substantially as described.

CLARENCE A. WORRALL.

Witnesses:
 CHRISTOPHER FALLON,
 CHAS. A. RUTTER.